USO11739652B2

(12) United States Patent
Marugi et al.

(10) Patent No.: US 11,739,652 B2
(45) Date of Patent: Aug. 29, 2023

(54) SEAL FOR REDUCING FLOW LEAKAGE WITHIN A GAS TURBINE ENGINE

(71) Applicant: Avio Polska Sp. z o.o., Bielsko-Biala (PL)

(72) Inventors: Krzysztof Tomasz Marugi, Miedzybrodzie Zywieckie (PL); Michal Brykalski, Biata-Bielsko (PL); Tomasz Kuba Borzecki, Biata-Bielsko (PL); Tomasz Kalwak, Biata-Bielsko (PL); Piotr Pawel Doerffer, Gdansk (PL); Pawel Zdzislaw Flaszynski, Gdansk (PL); Filip Aleksander Wasilczuk, Gdansk (PL)

(73) Assignee: Avio Polska Sp. z o.o., Bielsko-Biala (PL)

( * ) Notice: Subject to any disclaimer, the term of this patent is extended or adjusted under 35 U.S.C. 154(b) by 0 days.

(21) Appl. No.: 16/992,201

(22) Filed: Aug. 13, 2020

(65) Prior Publication Data

US 2021/0108529 A1    Apr. 15, 2021

(30) Foreign Application Priority Data

Aug. 14, 2019    (PL) ........................................ 430870

(51) Int. Cl.
*F01D 11/00*    (2006.01)
*F01D 11/02*    (2006.01)
*F01D 11/08*    (2006.01)

(52) U.S. Cl.
CPC ............ *F01D 11/001* (2013.01); *F01D 11/02* (2013.01); *F01D 11/005* (2013.01); *F01D 11/08* (2013.01);

(Continued)

(58) Field of Classification Search
CPC ...... F01D 11/001; F01D 11/02; F01D 11/005; F01D 11/08; F01D 11/10; F01D 11/04; F02C 7/28; F04D 29/083
See application file for complete search history.

(56) References Cited

U.S. PATENT DOCUMENTS 3,703,808 A    11/1972 Stearns
4,513,975 A    4/1985 Hauser et al.
(Continued)

OTHER PUBLICATIONS

Hilfer et al., Experimental Validation of a Curtain Type Fluidic Jet Seal on a Turbine Rotor Shroud, GT2015-42624, Conference: ASME Turbo Expo 2015: Turbine Technical Conference and Exposition, Montreal, Quebec, Canada, Jun. 2015. (Abstract Only) DOI: 10.1115/GT2015-42624.

*Primary Examiner* — Topaz L. Elliott
*Assistant Examiner* — Cameron A Corday
(74) *Attorney, Agent, or Firm* — Dority & Manning, P.A.

(57) ABSTRACT

A seal assembly for a gas turbine engine defining a central axis extending along an axial direction and including a rotating shaft extending at least partially along the axial direction. The seal assembly includes a first component coupled to a fixed structure or drivingly coupled to the rotating shaft. The seal assembly further includes a rotating component drivingly coupled to the rotating shaft of the gas turbine engine. Additionally, the first component and rotating component define an annular gap therebetween. The seal assembly also includes one or more flanges extending from the stationary component, the rotating component, or both. The flange(s) include a base and an external surface extending into the annular gap from the base to a tip. Additionally, the flange(s) defines an inlet port on the external surface fluidly coupled to an outlet port at the tip. As such, the flange(s) forms a seal within the annular gap.

19 Claims, 5 Drawing Sheets

(52) U.S. Cl.
CPC .... *F05D 2220/323* (2013.01); *F05D 2240/55* (2013.01)

(56) References Cited

U.S. PATENT DOCUMENTS

| | | |
|---|---|---|
| 4,571,937 A | 2/1986 | Albers |
| 4,752,185 A | 6/1988 | Butler et al. |
| 5,667,359 A | 9/1997 | Huber et al. |
| 6,925,814 B2 | 8/2005 | Wilson et al. |
| 7,988,410 B1 | 8/2011 | Liang |
| 9,856,739 B2 | 1/2018 | Bedrosyan et al. |
| 10,408,075 B2 | 9/2019 | Bunker |
| 2008/0080972 A1 | 4/2008 | Bunker |
| 2012/0034072 A1 | 2/2012 | Bagnall et al. |
| 2013/0149118 A1* | 6/2013 | Lotfi ................ F01D 5/225 277/412 |
| 2013/0272888 A1 | 10/2013 | Chouhan et al. |
| 2016/0108751 A1 | 4/2016 | Hogg et al. |
| 2017/0363011 A1 | 12/2017 | Dansereau et al. |
| 2019/0106999 A1 | 4/2019 | Jarossay et al. |
| 2019/0112939 A1* | 4/2019 | Kirner ................ F01D 5/20 |

\* cited by examiner

SEAL FOR REDUCING FLOW LEAKAGE WITHIN A GAS TURBINE ENGINE

GOVERNMENT SPONSORED RESEARCH

This invention was made with government support of the Innolot Coopernik of Poland. The government may have certain rights in the invention.

FIELD

The present subject matter relates generally to seals for gas turbine engines, more particularly, to seals for reducing flow leakage between rotating and stationary components of gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Turbofan gas turbine engines typically include a fan assembly that channels air to the core gas turbine engine, such as an inlet to the compressor section, and to a bypass duct. Gas turbine engines, such as turbofans, generally include fan cases surrounding the fan assembly including the fan blades. The compressor section typically includes one or more compressors with corresponding compressor casings. Additionally, the turbine section typically includes one or more turbines with corresponding turbine casings.

Certain gas turbine engine blades may include tip shrouds and/or seals to meet structural and/or performance requirements. For example, the tip shrouds and/or seals may reduce flow leakage through the cavity or passage between the blades and a stationary structural component, such as a static shroud, surrounding the blades and the rotor. Additionally, seals may be present between other rotating parts of the engine, such as rotating drive shafts, and support structures.

A gap generally remains at an interface of the tip shroud and/or seals, since it is necessary that there be some clearance at the junction of stationary and rotating components. However, the gap still provides a path that can allow flow leakage between the rotating parts and stationary components. As an example, it is often critical to minimize the leakage of hot gas between a rotor blade tip and the adjacent shroud. Various seals are often used to accomplish this objective. In fact, a gas turbine engine often must include a large number of different types of seals, some of which are in the form of labyrinth seals. Other examples include high-pressure packing seals between compressor and turbine sections, inducer flow seals, stage-to-stage turbine spacer wheel seals, and shaft leakage seals. However, existing tip shroud and seal design may not adequately limit or reduce flow leakage between the rotating parts and the stationary structural component associated with such rotating parts, which may result in a reduction in turbomachine efficiency.

As such, a need exists for an improved seal assembly for reducing flow leakage between rotating and stationary components of a gas turbine engine.

BRIEF DESCRIPTION

Aspects and advantages will be set forth in part in the following description, or may be obvious from the description, or may be learned through practice of the invention.

In one aspect, the present subject matter is directed to a seal assembly for a gas turbine engine defining a central axis extending along an axial direction and including a rotating shaft extending at least partially along the axial direction. The seal assembly includes a first component coupled to a fixed structure or drivingly coupled to the rotating shaft of the gas turbine engine. The seal assembly further includes a rotating component drivingly coupled to the rotating shaft of the gas turbine engine. Additionally, the first component and rotating component define an annular gap therebetween. The seal assembly also includes one or more flanges extending from the stationary component, the rotating component, or both. Moreover, the flange(s) include a base and an external surface extending into the annular gap from the base to a tip. Additionally, the flange(s) defines an inlet port on the external surface fluidly coupled to an outlet port at the tip. As such, the flange(s) forms a seal within the annular gap.

In one embodiment, the seal may be configured to channel pressurized air from the inlet port to the outlet port in order to form an air curtain within the annular gap. In one such embodiment, the outlet port may be configured to output the pressurized air in a transverse direction relative to the axial direction. In a further embodiment, the flange(s) may extend from the rotating component. In another embodiment, the inlet port may be configured to be positioned at a high pressure region surrounding the flange(s). In one particular embodiment, the first component may be a second rotating component drivingly coupled to the rotating shaft. In a further embodiment, the first component is a stationary component coupled to the fixed structure. In such an embodiment, the stationary component may include a casing, and the rotating component may include a rotor blade. In a further embodiment, the seal assembly may further includes a plurality of flanges arranged sequentially along the axial direction, each flange extending from at least one of the first component or the rotating component and including a base and an external surface extending into the annular gap from the base to a tip. In another embodiment, each of the plurality of flanges may define an inlet port on the external surface fluidly coupled to an outlet port at the tip. In one embodiment, the seal may be a labyrinth seal.

In another aspect, the present subject matter is directed to a rotary component for a gas turbine engine defining a central axis extending along an axial direction, a radial direction extending perpendicular to the axial direction, and a circumferential direction perpendicular to both the central axis and the radial direction. The rotary component includes a plurality of rotor blades operably coupled to a rotating shaft extending along the central axis. The rotary component further includes an outer casing arranged exterior to the plurality of rotor blades in the radial direction. Additionally, the outer casing defines an annular gap between a tip of each of the plurality of rotor blades and the outer casing. The rotary component further includes a seal positioned within the annular gap. The seal includes one or more flanges extending from at least one of the outer casing or at least one of the plurality of rotor blades. Moreover, the flange(s) include a base and an external surface extending into the annular gap from the base to a tip. Additionally, the flange(s) define an inlet port on the external surface fluidly coupled to an outlet port at the tip.

In one embodiment, the flange(s) may extend from at least one of the plurality of rotor blades. In a further embodiment, the seal may further include a plurality of flanges arranged sequentially along the axial direction. In such an embodiment, the flanges may extend from at least one of the outer casing or at least one of the plurality of rotor blades. Further, each of the flanges may include a base and an external surface extending into the annular gap from the base to a tip. In one embodiment, the inlet port may be positioned at one of an axially forward portion or an axially aft portion of the external surface.

In one particular embodiment, the rotary component may be a compressor of the gas turbine engine. In such an embodiment, the plurality of rotor blades may include a plurality of compressor blades, and the outer casing may include a compressor casing. In another embodiment, the rotary component may be a turbine of the gas turbine engine. In such an embodiment, the plurality of rotor blades may include a plurality of turbine blades, and the outer casing may include a turbine casing. It should be further understood that the rotary component may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 2A illustrates a seal assembly between a rotating component and a fixed component of the gas turbine engine, and FIG. 2B illustrates a seal assembly between two rotating components of the gas turbine engine;

Figure 1:
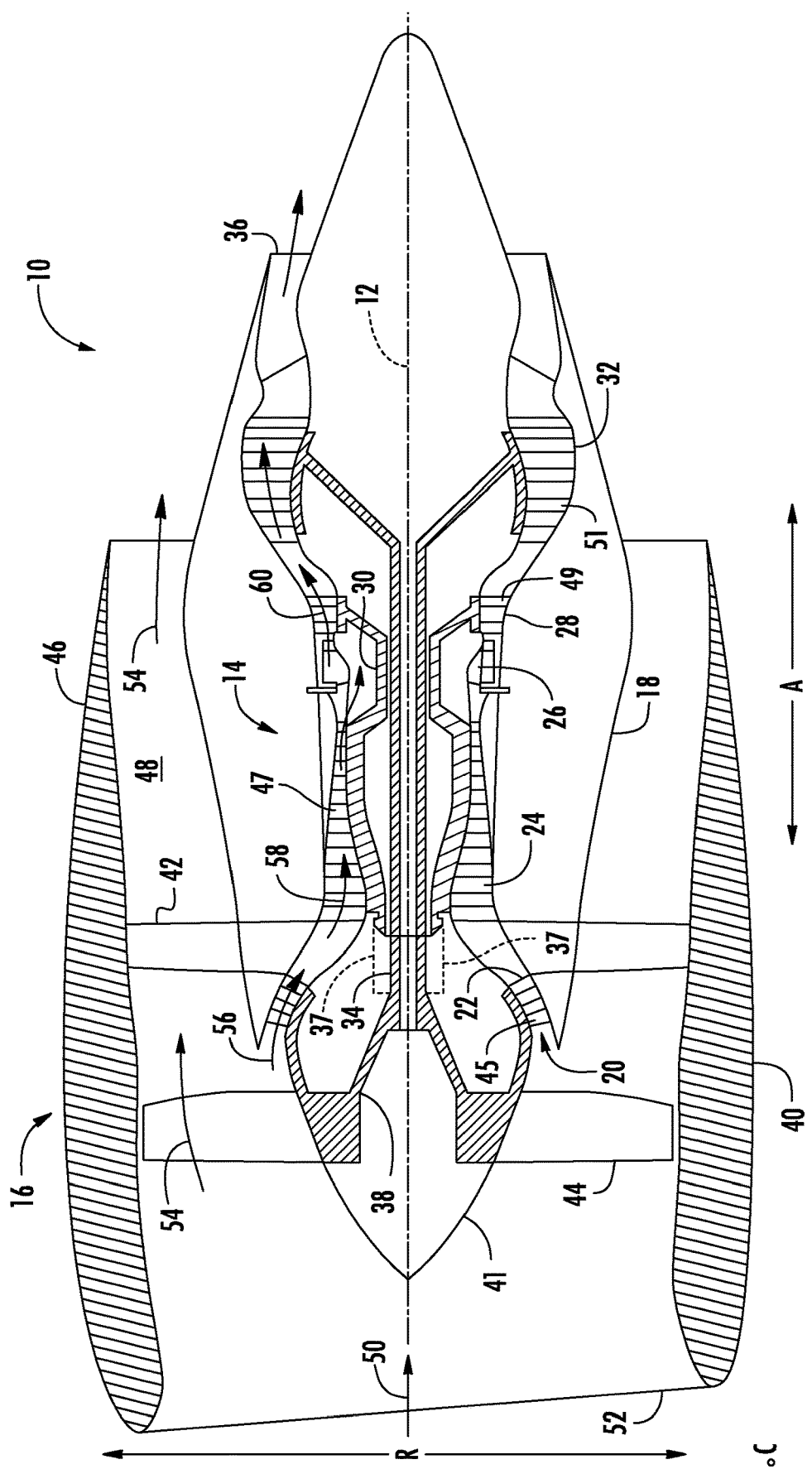
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A seal assembly for a gas turbine engine is generally provided for use between a first component attached to a fixed structure or rotating shaft of the gas turbine engine and a rotating component drivingly coupled to a rotating shaft of the gas turbine engine. For instance, the seal may be utilized to reduce a fluid flow through an annular gap defined between the rotating component and a stationary component attached to the fixed structure. In certain arrangements, the rotating component may be a rotor blade of the gas turbine engine, and the stationary component may be a casing of the gas turbine engine. Additionally, the seal assembly may include one or more flanges extending from the first component, the rotating component, or both to form the seal. More particularly, the flange(s) may include a base and an external surface extending from the base to a tip within the annular gap. Moreover, the flange(s) may define an inlet port on the external surface fluidly coupled to an outlet port at the tip of the flange(s) via an internal flowpath. Generally, the inlet port may be positioned at a high pressure region such that pressurized air is channeled to the tip of the flange. Thereby, flow leakage through the seal may be reduced and thus increase the efficiency of the gas turbine engine.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extending perpendicular from the centerline 12. Further, a circumferential direction C (shown in/out of the page in FIG. 1) extends perpendicular to both the centerline 12 and the radial direction R. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products 60 are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or a rotor disk, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required. Additionally, the fan rotor 38 and/or rotor disk may be enclosed or formed as part of a fan hub 41.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22.

The LP compressor 22 may include a plurality of compressor rotor blades (LP compressor blades 45) enclosed by the outer casing 18. The pressure of the second compressed air flow 56 is then increased and enters the HP compressor 24 (as indicated by arrow 58). Additionally, the HP compressor 24 may include a plurality of compressor rotor blades (HP compressor blades 47) enclosed by the outer casing 18. After mixing with fuel and being combusted within the combustor 26, the combustion products 60 exit the combustor 26 and flow through the HP turbine 28. Further, the HP turbine 28 may include a plurality of turbine rotor blades (HP turbine blades 49). Thereafter, the combustion products 60 flow through the LP turbine 32 and exit the exhaust nozzle 36 to provide thrust for the gas turbine engine 10. Furthermore, the LP turbine 32 may include a plurality of turbine rotor blades (LP turbine blades 51).

Figure 2A:
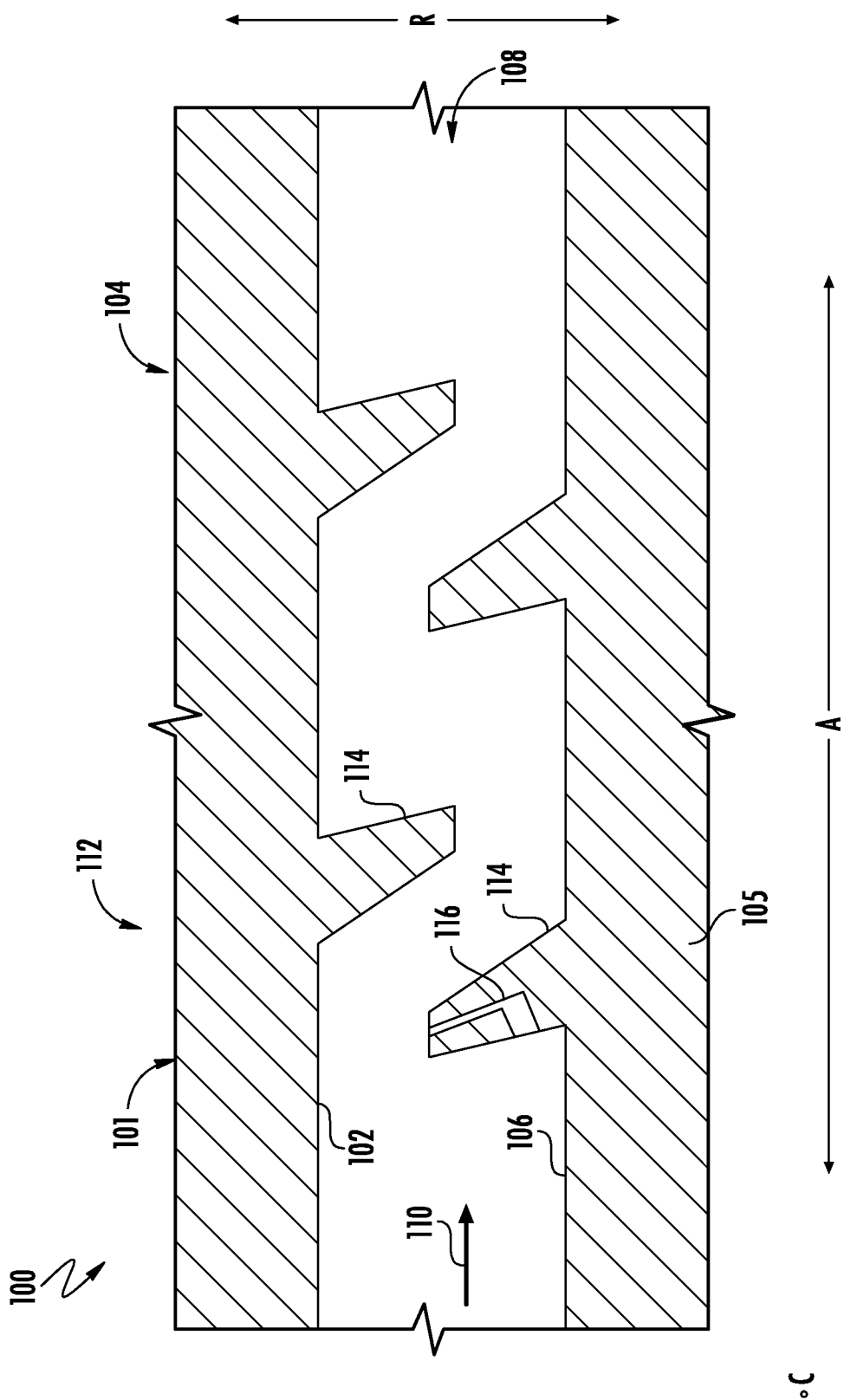
FIGS. 2A-2B illustrate schematic views of embodiments of seal assemblies that may be used in a gas turbine engine in accordance with aspects of the present subject matter, particularly.
Figure 2B:
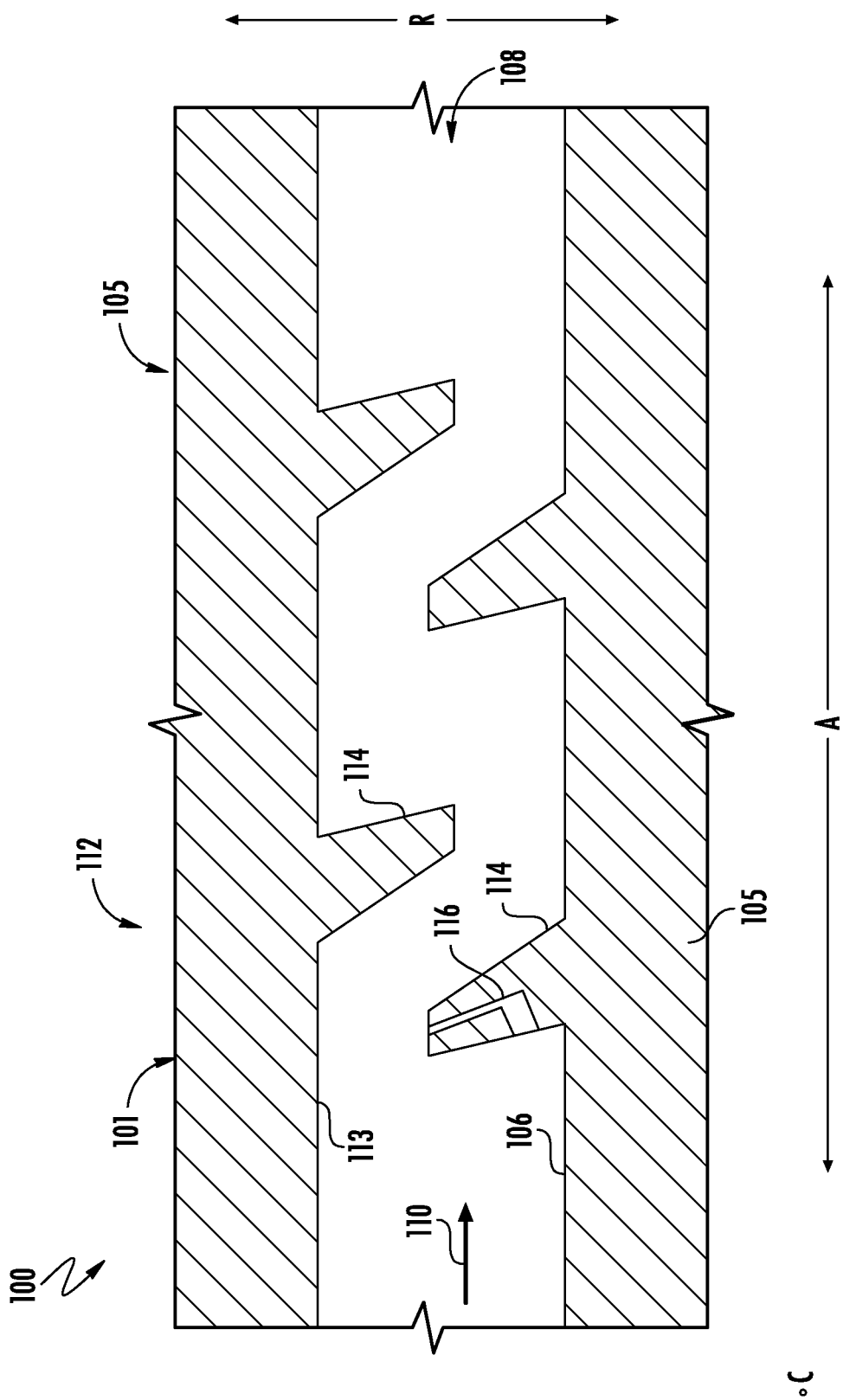

Referring now to FIGS. 2A-2B, two embodiments of seal assemblies 100 are illustrated schematically for use in a gas turbine engine in accordance with aspects of the present subject matter. More particularly, FIG. 2A illustrates a seal assembly 100 between a rotating component and fixed component of the gas turbine engine 10, and FIG. 2B illustrates a seal assembly 100 between two rotating components of the gas turbine engine 10. In general, the disclosed seal assemblies 100 may be utilized with any suitable gas turbine engine having any suitable configuration. For instance, the seal assemblies 100 may be utilized within the gas turbine engine 10 as described generally in regard to FIG. 1.

As shown particularly in regard to FIG. 2A, the seal assembly 100 may include a first component 101, configured as a stationary component 102, coupled to any fixed structure 104 (e.g., the outer casing 18, fan casing 40. Though the stationary component 102 is shown integrally formed with the fixed structure 104 in the embodiment of FIG. 2A, it should be appreciated that the stationary component 102 may be coupled to, integrally coupled to, or integrally formed with the fixed structure 104. Additionally, the seal assembly 100 may include a rotating component 106 driving coupled to a rotating shaft (e.g., the HP shaft 30, the LP shaft 34, or any other rotating shaft of the gas turbine engine 10). In the embodiment of FIG. 2A, the rotating component 106 is shown integrally formed with the rotating structure 105. However, in other embodiments, the rotating component may be coupled to, integrally coupled to, or formed with the rotating structure 105. The rotating structure 105 may include the HP shaft 30, the LP shaft 34, or any intermediary component drivingly coupled between the rotating component 106 and the rotating shaft 30, 34. As such, it should be appreciated that the seal assembly 100 may be positioned between one or more of the rotor blades 45, 47, 49, 51 or the fan blades 44 and the outer casing 18 or the fan casing 40. In other embodiments, it should be appreciated that the seal assembly 100 may be positioned between any other stationary component 102 and a rotating shaft 30, 34. For instance, one or more seal assemblies 100 may be positioned around a sump housing surrounding one or more bearings supporting the rotating shafts 32, 34.

As shown particularly in regard to FIG. 2B, in another embodiment, the first component 101 may be a second rotating component 113 drivingly coupled to a rotating shaft 30, 34, such as via another rotating structure 105. Though the second rotating component 113 is shown integrally formed with the rotating structure 105 in FIG. 2B, it should be appreciated that the second rotating structure 113 may be coupled to or integrally coupled to the rotating structure 105. In one example, one or more seal assemblies 100 may be positioned between rotating structures 105, such as rotating shafts 30, 34 or components drivingly coupled to the rotating shafts 30, 34. Additionally, the first component 101 and rotating component 106 may define an annular gap 108 therebetween. It should be recognized that the annular gap 108 may be necessary in order to allow the rotating component 106 to rotate relative to the first component 101.

As shown in FIGS. 2A and 2B, the seal assembly 100 may generally help block or reduce a fluid flow 110 through the annular gap 108. Moreover, by reducing the fluid flow 110 through the annular gap 108, the efficiency of the of the gas turbine engine 10 may be increased. In certain embodiments, as shown, a seal of the seal assembly 100 may be configured as a labyrinth seal 112. For instance, the seal assembly 100 may include one or more flanges 114 extending from the first component 101 and/or the rotating component 106 into the annular gap 108. As such, the seal of the seal assembly 100 configured as a labyrinth seal 112 may provide a tortious path through the annular gap 108 in order to reduce the fluid flow 110 between the first component 101 and the rotating component 106.

In the embodiments of FIGS. 2A and 2B, the flanges 114 may alternately extend from the rotating component 106 and the first component 101. More particularly, the flanges 114 may be sequentially arranged along the axial direction A with each flange 114 extending from one the first component 101 or the rotating component 106. However, in certain embodiments, each of the flanges 114 may extend from one of the first component 101 or the rotating component 106. In other embodiments, one or more flanges 114 may extend from the first component 101 or rotating component 106 followed by one or more flanges 114 extending from the other of the first component 101 or rotating component 106. In still other embodiments, it should be recognized that the flange(s) 114 may have any suitable arrangement within the annular gap 108. As will be described in more detail in regard to FIGS. 3-5, at least one of the flanges 114 may define an internal flowpath 116 in order to reduce the fluid flow 110 through the annular gap 108.

Figure 3:
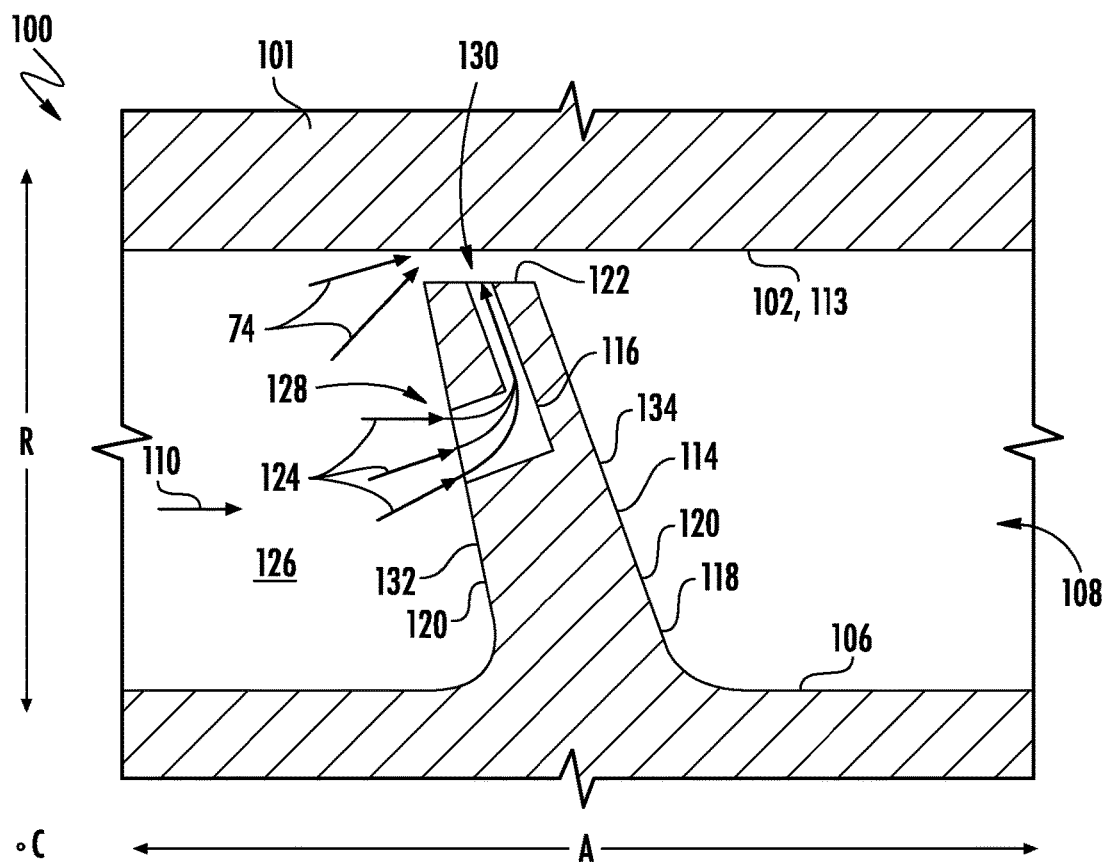
FIG. 3 illustrates a schematic drawing one embodiment of a flange of the seal assembly of FIGS. 2A-2B in accordance with aspects of the present subject matter, particularly illustrating the flange defining an internal flowpath.

Referring now to FIG. 3, a schematic drawing of one embodiment a flange 114 of a seal, such as the labyrinth seal 112 of FIGS. 2A-2B, is illustrated in accordance with aspects of the present subject matter. More particularly, the embodiment of FIG. 3 illustrates the flange 114 defining the internal flowpath 116. As illustrated, the flange 114 may extend from the rotating component 106. For instance, the flange 114 may include a base 118 extending from, e.g., coupled to or formed integrally with, the rotating component 106. Additionally, the flange 114 may include an external surface 120 extending from the base 118 into the annular gap 108 to a tip 122. However, it should be appreciated one or more flanges 114 including internal flowpaths 116 may extend from the first component 101, such as the stationary component 102 or the second rotating component 106. Generally, the internal flowpath 116 may allow for sealing air 124 to be channeled from a high pressure region 126 to the tip 122 of the flange 114. As such, the sealing air 124 may reduce leakage flow, as indicated by arrows 74, of the fluid flow 110 from flowing between the tip 122 of the flange 114 and the first component 101.

As illustrated in FIG. 3, the external surface 120 of the flange 114 may define an inlet port 128 fluidly coupled to an outlet port 130 by the internal flowpath 116. For instance, in the depicted embodiment, the inlet port 128 may be positioned at a high pressure region 126 of the external surface 120, such as within the path of the fluid flow 110. Additionally, the outlet port 130 may be positioned at the tip 122. As such, the flange 114 may direct the sealing air 124 from the inlet port 128, through the internal flowpath 116, and to the outlet port 130 in order to form a seal within the annular gap 108. It should be appreciated that the high pressure region 126 may be positioned radially inward from the tip 122. In certain embodiments, the rotation of the rotating component 106 may cause the tip 122 of the flange 114 to move at a higher velocity than the base 118 of the flange 114. As such, the external surface 120 of the flange 114 may be surrounded by air with higher pressure near the base 118 as compared to the tip 122. Moreover, by placing the inlet port 128 at the high pressure region 126, the pressurized air, e.g., sealing air 124, may be channeled through the internal flowpath 116 in order to form an air curtain at the tip 122 and thus an improved seal within the annular gap 108. Additionally, as shown, the high pressure region 126 may be positioned at an axially forward portion 132 of the external surface 120. However, in other embodiments, the high pressure region 126 may be positioned at an axially aft portion 134 of the external surface 120.

Still referring to the embodiment of FIG. 3, the outlet port 130 may be configured to output the pressurized sealing air 124 in a transverse direction relative to the axial direction A. For instance, the outlet port 130 may be configured to output the sealing air 124 in generally the radial direction R. In further embodiments, the outlet port 130 may be configured to output the sealing air 124 at least partially in the circumferential direction C. Additionally, the outlet port 130 may have various sizes, shapes, and configurations in order to output the sealing air 124 at the tip 122. For instance, the outlet port 130 may include one or more holes, grooves, notches, slots, or other suitable geometric configurations.

Figure 4:
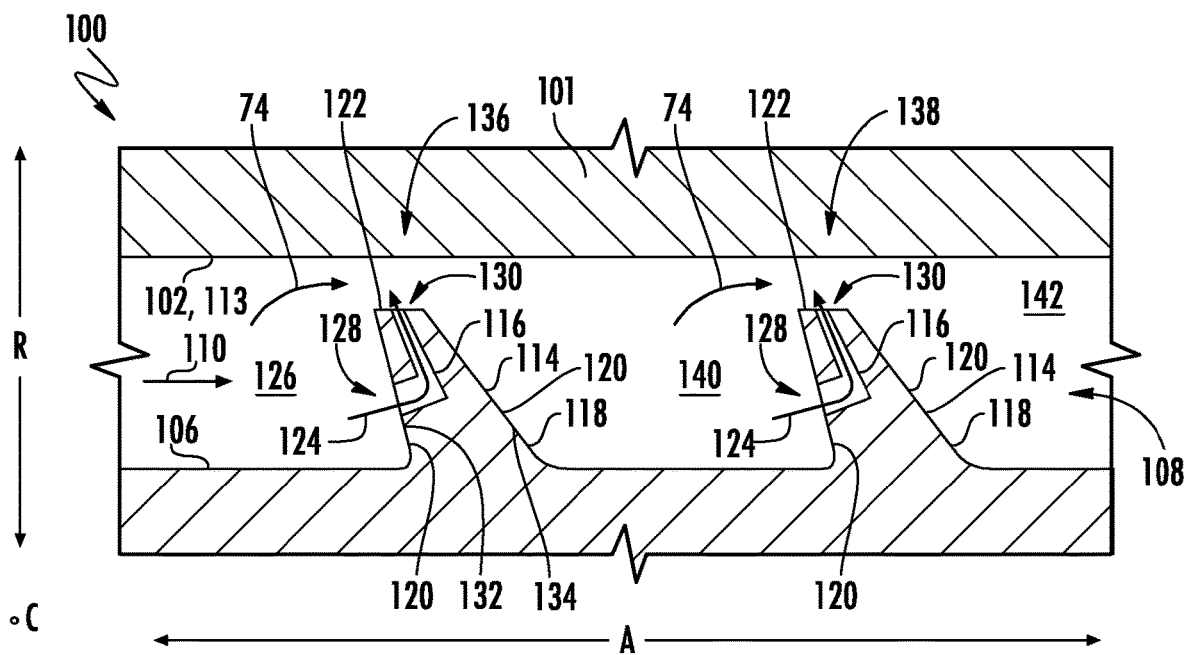
FIG. 4 illustrates another embodiment of a seal assembly that may be utilized in a gas turbine engine in accordance with aspects of the present subject matter, particularly illustrating a seal including flanges each defining an internal flowpath.

Referring now to FIG. 4, another embodiment of the seal that may be utilized in the gas turbine engine 10 is illustrated in accordance with aspects of the present subject matter. Particularly, FIG. 4 illustrates a seal assembly 100 including flanges 114 each defining an internal flowpath 116. Moreover, each of the flanges 114 may be arranged sequentially along the axial direction A. As shown, the seal assembly 100 may include an axially forward flange 114 (first flange 136) and an axially aft flange 114 (second flange 138) each of which may be configured generally as the flange 114 as described in regard to FIG. 3. Moreover, the first and second flanges 136, 138 are illustrated extending from the rotating component 106. However, in other embodiments, one or both of the flanges 136, 138 may extend from the first component 101. Additionally, it should be appreciated that the seal assembly 100 may include more than two flanges 114, such as three or more. In certain embodiments, all of the flanges 114 may include the internal flowpath 116, or, alternatively, a portion of the flanges 114 may include the internal flowpath 116.

As shown in FIG. 4, the first flange 136 may define an input port 128 at the high pressure region 126 such that pressurized sealing air 124 is channeled to the outlet port 130 at the tip 122 of the first flange 136. As such, the first flange 136 may reduce leakage flow 74 through the annular gap 108 as generally described in regard to FIG. 3. Additionally, the second flange 138 may define an input port 128 at a second high pressure region 140 such that pressurized sealing air 124 is channeled to the outlet port 130 at the tip 122 of the second flange 138. As such, the second flange 138 may further reduce leakage flow 74 through the annular gap 108 as described in regard to FIG. 3. Further, the combination of flanges 136, 138 may reduce the fluid flow 110 through the annular gap 108. It should be recognized that, in certain embodiments, the high pressure region 126 may be at a higher pressure than the pressure at the outlet port 130 of the first flange 136. Additionally, the pressure at the outlet port 130 of the first flange 136 may be higher than the pressure of the second high pressure region 140. In another embodiment, the input ports 128 may be positioned on the axially aft portion 134 of external surface 120 of each flange 114. In such an embodiment, a third high pressure region 142 aft of the second flange 138 may be higher than the pressure at the outlet port 130 of the second flange 130, which may be higher than the pressure in the second high pressure region 140, which may be higher than the pressure at the outlet port 130 of the first flange 136, which may be higher than the pressure at the first high pressure region 126.

Figure 5:
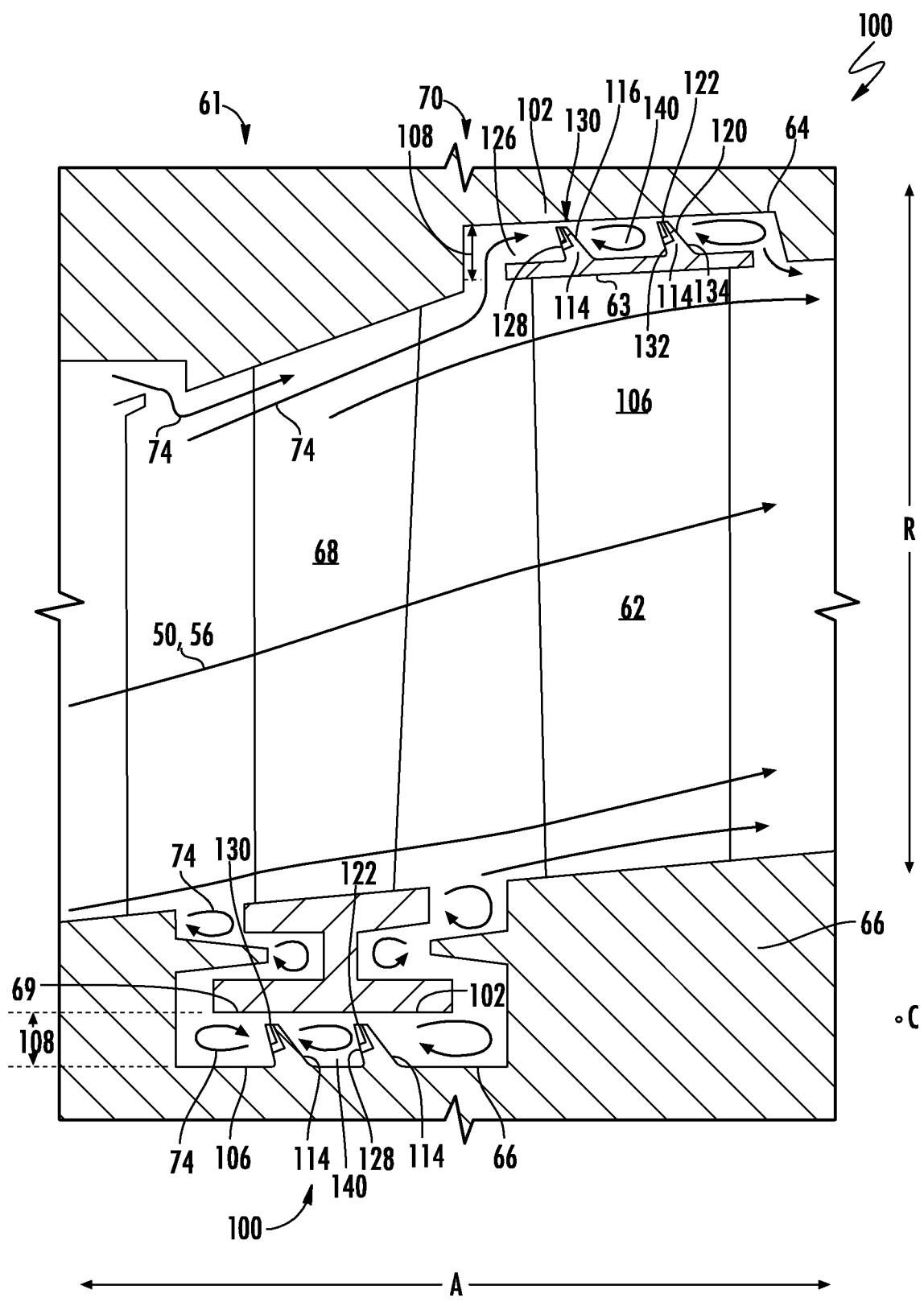
FIG. 5 illustrates a schematic view of a rotary component of the gas turbine engine in accordance with aspects of the present subject matter, particularly illustrating the rotary component including multiple seals.

Referring now to FIG. 5, illustrated schematically is rotary component 61 of the gas turbine engine 10. Particularly, FIG. 5 illustrates the rotary component 61 including multiple seal assemblies 100. It should be appreciated that the seal assemblies 100 of FIG. 5 may generally be configured as any of the seal assemblies 100 of FIGS. 2A-4 or any other suitable configuration of a seal assembly 100 including the internal flowpath 116. Although the rotary component 61 is described as a component of the gas turbine engine 10, it should be recognized that the rotary component 61 may be utilized in any suitable configuration of a gas turbine engine. Specifically, the rotary component 61 may be configured as a portion of the LP compressor 22, the HP compressor 24, the fan section 16, the HP turbine 28, the LP turbine 32, and/or any other rotary component 61 of the gas turbine engine 10.

The rotary component 61 may include one or more sets of circumferentially spaced rotor blades 62, such as the LP compressor blades 45, HP compressor blades 47, HP turbine blades 49, or LP turbine blades 51, which extend radially outward towards an outer casing 64 from a hub 66. As such, the rotor blades 62 may be coupled to a rotating shaft (such as the HP shaft 30 or LP shaft 34 as shown in FIG. 1). Further, the outer casing 64 may be arranged exterior to the rotor blades 62 in the radial direction R. It should be appreciated that the outer casing 64 may be a part of the outer casing 18 or fan casing 40 or a standalone component coupled thereto. Additionally, the outer casing 64 may be a compressor casing, turbine casing, or a fan casing (e.g., a fan containment casing) and may include intermediary structures, such as a shroud. One or more sets of circumferentially-spaced stator blades 68 (of which only a single stator blade 68 is shown in FIG. 5) may be positioned adjacent to each set of rotor blades 62, and in combination form one of a plurality of stages 70 (of which only a single stage 70 is shown in FIG. 5). However, in other embodiments, such stator blades 68 may be absent, such as when the rotary component 61 is the fan section 16. Each of the stator blades 68 may be securely coupled to the outer casing 64 and extends radially inward to interface with the hub 66. Each of the rotor blades 62 may be circumscribed by the outer casing 64, such that an annular gap 108 is defined between the outer casing 64 and a rotor blade tip 63 of each rotor blade 62. Likewise, the stator blades 68 are disposed relative to the hub 66, such that an annular gap 108 is defined between the hub 66 and a stator inner band 69 of each of the stator blades 68.

During operation, an operating range of the rotary component 61 is generally limited due to leakage flow, as indicated by directional arrows 74, proximate the rotor blade tips 63. Further, the rotary component 61 may include a seal assembly 100 at the annular gap 108 defined between the blade tip(s) 63 and the outer casing 64. For instance, in such an embodiment, the stationary component 102 may include the outer casing 64 arranged exterior to the rotor blade 62 in the radial direction R, and the rotating component 106 may include the rotor blade(s) 62 and/or the rotor blade tip(s) 63. Further, the seal of the seal assembly 100 may include one or more flanges 114 extending from at least one of the outer casing 64 or one or more of the rotor blades 62, such from the rotor blade tip(s) 63 as depicted in FIG. 5. For instance, the flanges 114 may be arrange sequentially along the axial direction A within the annular gap 108 defined between the rotor blades 62 and the outer casing 64. Additionally, as shown and described in regard to FIGS. 2A-4, one or more of the flanges 114 may include internal flowpaths 116 to fluidly couple inlet ports 128 at high pressure region(s) 126, 140 (FIGS. 3 and 4) to outlet ports 130 at the tips 122 of the flanges 114. As shown, the inlet ports 128 are depicted on the axially forward portion 132 of the external surface 120 of the flanges 114. Such an arrangement may be particularly applicable where the rotary component 61 is configured as a turbine. However, in another embodiment, the inlet ports 128 may be on the axially aft portion 134 of the external surface 120 of the flanges 114. Such an arrangement may be particularly applicable where the rotary component 61 is configured as a compressor. As such, the seal assembly 100 may reduce leakage flow 74 between the tip(s) 122 of the flange(s) 114 and the outer casing 64 and thus increase the efficiency of the gas turbine engine 10.

It should further be recognized that seal of the seal assembly 100 may be placed in any annular gap 108 defined between a rotating component 106 and a first component 101 (e.g., a stationary component 102 or second rotating component 113) of the gas turbine engine 10. For example, still referring to the embodiment of FIG. 5, a seal may be positioned between a stator inner band 69 of the stator blade 68 (e.g., the stationary component 102) and the hub 66 and/or a rotor (e.g., the rotating component 106) of the gas turbine engine 10. More particularly, a seal assembly 100 with one or more flanges 114 positioned between the stator blade 68 and the hub 66 may reduce leakage flow 74 in the annular gap 108 defined therebetween. Additionally, at least one of the flanges 114 may include the inlet port 128 fluidly coupling a high pressure region 126 (FIG. 3) to an outlet port 130 at the tip 122 of the flange 114. As such, the seal assembly 100 may reduce leakage flow 74 between the tip 122 of the flange 114 and the stator inner band 69 and thus increase the efficiency of the gas turbine engine 10.

In one embodiment, the first component 101, rotating component 106, and/or flange(s) 114 may include at least one of a metal, metal alloy, or composite material. For instance, the rotor blades 62, flange(s) 114, and/or outer casing 64 may be formed at least partially from a ceramic matrix composite. More particularly, in certain embodiments, the rotor blades 62, flange(s) 114, and/or outer casing 64 may be formed from one or more ceramic matrix composite prepreg plies. In another embodiment, the rotor blades 62, flange(s) 114, and/or outer casing 64 may be formed from a ceramic matrix composite woven structure (e.g., a 2D, 3D, or 2.5D woven structure). In still other embodiments, the rotor blades 62, flange(s) 114, and/or outer casing 64 may be formed at least partially from a metal, such as but not limited to, steel, titanium, aluminum, nickel, or alloys of each. For instance, in certain embodiments, the rotor blades 62, flange(s) 114, and/or outer casing 64 may be cast. Though, it should be recognized that the rotor blades 62, flange(s) 114, and/or outer casing 64 may be formed from multiple materials, such as a combination of metals, metal alloys, and/or composites. Further, in certain embodiments, an interior surface of the outer casing 64 may include a spray on abradable coating.

Composite materials may include, but are not limited to, metal matrix composites (MMCs), polymer matrix composites (PMCs), or ceramic matrix composites (CMCs). Composite materials, such as may be utilized in the rotor blade(s) 62, flanges 114, and/or outer casing 64, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In certain embodiments, the thermal processing may take place in an autoclave.

Similarly, in various embodiments, PMC materials may be fabricated by impregnating a fabric or unidirectional tape with a resin (prepreg), followed by curing. For example, multiple layers of prepreg plies may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., a pressure side or a suction side). The PMC material is placed inside of a bag and a vacuum is utilized to hold the PMC material against the die during curing. In still other embodiments, the rotor blade 62, flange 114, and/or outer casing 64 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers. The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In general, the exemplary embodiments of the rotor blades 62, flanges 114, and/or outer casing 64 described herein may be manufactured or formed using any suitable process. However, in accordance with several aspects of the present subject matter, the rotor blades 62, flanges 114, and/or outer casing 64 may be formed using an additive-manufacturing process, such as a 3D printing process. The use of such a process may allow the rotor blades 62, flanges 114, and/or outer casing 64 to be formed integrally, as a single monolithic component, or as any suitable number of sub-components. In particular, at least one feature flange 114 may be formed on the rotor blade 62 via an additive-manufacturing process. Forming the flange 114 via additive manufacturing may allow the flange 114 to be integrally formed and include a variety of characteristics not possible when using prior manufacturing methods. For example, the additive manufacturing methods described herein enable the manufacture of flange(s) 114 having any suitable size and shape with one or more configurations, some of these novel features are described herein.

As used herein, the terms "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based super alloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the rotor blades 62, flanges 114, outer casing 64, and/or internal or external passageways such as the internal flowpath 116, openings such as inlet and outlet ports 128, 130, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together forms the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the flanges 114 described herein. For example, such components may include thin additively manufactured layers and unique fluid passageways or cavities, such as the inlet and outlet ports 128, 130 and the internal flowpath 116. In addition, the additive manufacturing process enables the manufacture of a single component having different materials such that different portions of the component may exhibit different performance characteristics. The successive, additive nature of the manufacturing process enables the construction of these novel features. As a result, the seal assembly(ies) 100 and rotary component(s) 61 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly for a gas turbine engine, the gas turbine engine defining a central axis extending along an axial direction and the gas turbine engine comprising a rotating shaft extending at least partially along the axial direction, the seal assembly comprising:
a first component coupled to a fixed structure or drivingly coupled to the rotating shaft of the gas turbine engine;
a rotating component drivingly coupled to the rotating shaft of the gas turbine engine, wherein the first component and rotating component define an annular gap therebetween; and
at least one flange extending from at least one of the first component or the rotating component, the at least one flange comprising:
a base; and
an external surface that extends linearly from the base toward a tip of the at least one flange, wherein the external surface extends into the annular gap;
wherein the at least one flange defines an inlet port on the external surface fluidly coupled to an outlet port at the tip,
wherein the at least one flange extends from the rotating component and the inlet port is positioned on the external surface at a location that is radially spaced from the base or wherein the at least one flange extends from the first component and the inlet port is positioned on the external surface at a location that is radially spaced from the base, and
wherein the at least one flange forms a seal within the annular gap.

2. The seal assembly of claim 1, wherein the seal is configured to channel pressurized air from the inlet port to the outlet port in order to form an air curtain within the annular gap, wherein the outlet port is configured to output the pressurized air in a transverse direction relative to the axial direction.

3. The seal assembly of claim 1, wherein the at least one flange extends from the rotating component.

4. The seal assembly of claim 1, wherein the inlet port is configured to be positioned at a high pressure region surrounding the at least one flange.

5. The seal assembly of claim 1, wherein the first component is a second rotating component drivingly coupled to the rotating shaft.

6. The seal assembly of claim 1, wherein the first component is a stationary component coupled to the fixed structure, the stationary component including a casing,
wherein the rotating component includes a rotor blade, and
wherein the seal is a labyrinth seal.

7. The seal assembly of claim 1, wherein the seal assembly further includes a plurality of flanges arranged sequentially along the axial direction, each flange extending from at least one of the first component or the rotating component and including a base and an external surface extending into the annular gap from the base to a tip, wherein each of the plurality of flanges defines an inlet port on the external surface fluidly coupled to an outlet port at the tip.

8. The seal assembly of claim 1, wherein the at least one flange extends from at least one of the first component or the rotating component in a radial direction.

9. The seal assembly of claim 1, wherein the external surface extends radially from the base toward the tip.

10. The seal assembly of claim 1, wherein the first component comprises a circumferentially extending surface, wherein the rotating component comprises a circumferentially extending surface, wherein the at least one flange extends from at least one of the circumferentially extending surface of the first component or the circumferentially extending surface of the rotating component in a radial direction.

11. A rotary component for a gas turbine engine defining a central axis extending along an axial direction, a radial direction extending perpendicular to the axial direction, and a circumferential direction perpendicular to both the central axis and the radial direction, the rotary component comprising:

a plurality of rotor blades operably coupled to a rotating shaft extending along the central axis;

an outer casing arranged exterior to the plurality of rotor blades in the radial direction, the outer casing defining an annular gap between a tip of each of the plurality of rotor blades and the outer casing; and a seal positioned within the annular gap, the seal comprising:

at least one flange extending from at least one of the outer casing or at least one of the plurality of rotor blades, the at least one flange comprising:

a base; and an external surface that extends linearly from the base toward a tip of the at least one flange, wherein the external surface extends into the annular gap;

wherein the at least one flange defines an inlet port on the external surface fluidly coupled to an outlet port at the tip, and wherein the at least one flange extends from the at least one of the plurality of rotor blades and the inlet port is positioned on the external surface at a location that is radially spaced from the base or wherein the at least one flange extends from the outer casing and the inlet port is positioned on the external surface at a location that is radially spaced from the base.

12. The rotary component of claim 11, wherein the seal is configured to channel pressurized air from the inlet port to the outlet port in order to form an air curtain within the annular gap.

13. The rotary component of claim 11, wherein the at least one flange extends from at least one of the plurality of rotor blades.

14. The rotary component of claim 11, wherein the inlet port is configured to be positioned at a high pressure region surrounding the at least one flange.

15. The rotary component of claim 11, wherein the inlet port is positioned at one of an axially forward portion or an axially aft portion of the external surface.

16. The rotary component of claim 11, wherein the seal further includes a plurality of flanges arranged sequentially along the axial direction, each flange extending from at least one of the outer casing or at least one of the plurality of rotor blades, each of the flanges including a base and an external surface extending into the annular gap from the base to a tip, wherein each of the plurality of flanges defines an inlet port on the external surface fluidly coupled to an outlet port at the tip.

17. The rotary component of claim 11, wherein the rotary component is a compressor of the gas turbine engine, wherein the plurality of rotor blades includes a plurality of compressor blades, and wherein the outer casing includes a compressor casing.

18. The rotary component of claim 11, wherein the rotary component is a turbine of the gas turbine engine, wherein the plurality of rotor blades includes a plurality of turbine blades, and wherein the outer casing includes a turbine casing.

19. The rotary component of claim 11, wherein the seal is a labyrinth seal.

* * * * *